June 3, 1969 CARL-AXEL STRÖMER 3,448,225

TELEPHONE HOOK SWITCH MECHANISM

Filed Dec. 8, 1965

INVENTOR.
CARL-AXEL STRÖMER
BY Hane and Nydick
ATTORNEYS

United States Patent Office 3,448,225

Patented June 3, 1969

3,448,225
TELEPHONE HOOK SWITCH MECHANISM

Carl-Axel Strömer, Bromma, Sweden, assignor to Telefonaktiebolaget L M Ericsson, Stockholm, Sweden, a corporation of Sweden Filed Dec. 8, 1965, Ser. No. 512,430
Claims priority, application Sweden, Feb. 5, 1965, 1,486/65
Int. Cl. H04m 1/08
U.S. Cl. 179—159 7 Claims

ABSTRACT OF THE DISCLOSURE

A hook switch mechanism for the contact spring assembly of a telephone instrument operates the spring assembly by a joined up and down movement respectively of two posts each of which has hinged thereto one end of a lever, the other end of which is hingedly connected to a stationary part of the instrument. The levers intersect with each other and coact with the spring assembly to operate the assembly in response to a downward or upward movement of the posts as respectively caused by replacement of the handset of the instrument or lifting of the same for making a call.

The present invention refers to a hook switch mechanism for telephone instruments, i.e., to a mechanical device by means of which a contact spring group in the instrument is actuated when the handset of the instrument is lifted or put down. The invention thus refers to an improvement on known devices and provides in comparison to these a simple and inexpensive device that has the advantage of being easily mounted and space saving, has a low weight and gives small friction losses, which in turn results in low wear even at a high using frequency.

The mechanism comprises like the known devices two symmetrically arranged, vertically displaceable posts that are vertically displaced when the handset is lifted or put down. The posts are inside the instrument mechanically coupled to rotatable members for transmitting the movement of the posts to the contact spring group of the instrument and the invention is especially characterized by said rotatable members comprising two oppositely directed and intersecting levers of a plastic material arranged to actuate the contact spring group by coacting with the same at the point of interaction. Each of the levers engages at one end a recess in the respective post and is provided at its other end with a claw for gripping a projection of the instrument housing, said claw and the remainder of the lever being joined by means of a thin flexible section constituting a line hinge.

Figure 1:
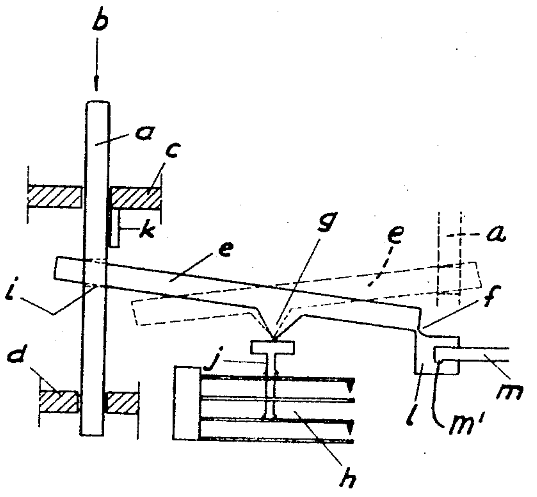
Figure 2:
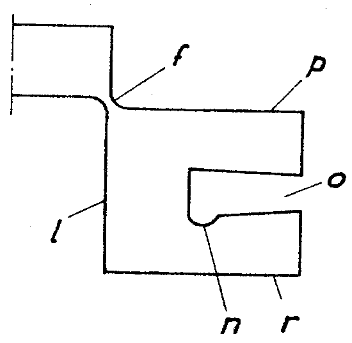

The invention will be further described with reference to the attached drawing that shows the device in principle, wherein FIG. 1 is a view of a post with a pertaining lever, and FIG. 2 shows the claw end of the lever on an enlarged scale.

In a housing *c*, *d* of a telephone instrument is displaceably arranged a post *a* shaped as a flat piece which, when the handset is restored, is displaced in the direction of the arrow *b*. One end of a lever *e* protrudes into a hole in the post, the other end of said lever being hinged to a projection or claw *m* on the housing. The shown lever is made of a plastic material (for instance polypropylene) which permits a very simple fastening arrangement. At the end of the lever there is provided a forked part 1 to which the lever is joined by means of a thin flexible section *f*. The forked part has two legs *p* and *r* defining therebetween an open space *o* for receiving the projection *m*. The open space *o* is at its mouth somewhat narrower than the thickness of the projection *m* and has at its inner part on the leg *r* a small recess *n*, which is engaged by a small nose *m'* at the outer part of the projection when the forked part is pushed into the projection. With this fastening arrangement no other construction element is required for fastening of the lever to the projection *m* and a hinge free of play is obtained.

At its intermediate portion the lever *e* is provided with a pointed projection *g* for actuating a stud or lifting bar *j* that is arranged for actuating a contact spring group *h* of the instrument. The lifting bar *j* is upwardly biassed in the vertical direction by a spring force (not shown) which upon removal of the handset lifts the lifting bar together with the lever *e* and the post *a*. In order to limit such displacement, the housing is provided with a stop *k*. By using the lever principle for transmitting the movement from the hook to the spring group it is conveniently possible to dimension the device so that a suitable ratio between the displacement distance of the lifting bar and of the respective post is obtained. This ratio of exchange is of importance in view of the modern tendency of making the handset light.

In order to simplify the drawing only one post and the corresponding lever are shown in full lines. The other post with its lever has been indicated by dotted lines. Said post is located symmetrically to the first-mentioned post with regard to the center line of the lifting bar.

I claim:

1. A hook switch mechanism for actuating a contact spring assembly of a telephone instrument upon lifting or replacing the handset of the instrument, said mechanism comprising in combination:
   - a housing;
   - a pair of posts supported by the housing parallel to each other but spaced apart and jointly up and down displaceable with reference to the housing in response to lifting or replacing the handset;
   - a contact spring assembly disposed between the posts, the springs in said assembly being operable by applying pressure thereto; and
   - a pair of levers each hinged on one end to one of said posts and extending toward the other post, the other end of each lever being hingedly connected to stationary portion of the instrument, said levers intersecting each other at a point adjacent to said spring assembly and engaging the same with a pressure engagement upon downward displacement of the posts thereby operating the springs of the assembly.

2. A hook switch mechanism according to claim 1 and further comprising hinge means for hinging the levers to the posts, each of said hinge means including a recess in the respective post engaged by the respective lever end with a loose fit thereby permitting a pivotal movement of the levers with reference to the posts.

3. The hook switch mechanism according to claim 1 and further comprising hinge means for hingedly connecting said other lever ends to said stationary housing portions, each of said hinge means comprising a flexible portion included in the respective lever at the respective stationary portion, each of said flexible portions constituting a live hinge.

4. The hook switch mechanism according to claim 3 wherein each of said levers is made of a plastic material and includes adjacent to the respective stationary portion a part thinner than the remainder of the lever thereby rendering the thinner lever portion flexible, the remainder of the levers being substantially rigid.

5. The hook switch mechanism according to claim 1 and further comprising hinge means for hingedly connecting said other lever ends to said stationary housing portions, each of said hinge means including a forked part at said other lever end and a claw extending from said stationary portion and releasably retained between the forks of said forked part, and a flexible portion included in each lever at said forked end part.

6. The hook switch mechanism according to claim 5 wherein the forks of each of said forked lever parts are flexible and define a constricted entry mouth, the maximal peripheral outline of each of said claws being larger than the peripheral outline of the mouth entry in the relaxed positions of the forks.

7. The hook switch mechanism according to claim 6 wherein each of said claws and each of said forked lever parts define a nose and recess, respectively, engaged with each other when the claws are retained in the forked lever parts.

No references cited.

KATHLEEN H. CLAFFY, *Primary Examiner.*

JAN S. BLACK, *Assistant Examiner.*